United States Patent [19]

Zhang et al.

[11] Patent Number: 5,526,055

[45] Date of Patent: Jun. 11, 1996

[54] APPARATUS AND METHOD TO DERIVE A TELEVISION COLOR SUBCARRIER FREQUENCY SIGNAL FROM A COMPUTER VIDEO SIGNAL

[75] Inventors: Sunny Y. Zhang, Palo Alto; Justin J. Lin, Sunnyvale, both of Calif.

[73] Assignee: AITECH International, Fremont, Calif.

[21] Appl. No.: 441,544

[22] Filed: May 15, 1995

[51] Int. Cl.⁶ .................................................. H04N 9/45
[52] U.S. Cl. ...................... 348/510; 348/540; 348/453
[58] Field of Search ............................... 348/500, 501, 348/502, 505–510, 521, 536, 537, 539, 540, 549, 441, 446, 453, 457, 642, 497, 498; H04N 9/45, 7/01, 11/02

[56] References Cited

U.S. PATENT DOCUMENTS

| | | | |
|---|---|---|---|
| 4,985,754 | 1/1991 | Levan | 348/642 |
| 5,068,717 | 11/1991 | Jenison | 348/506 |
| 5,206,726 | 4/1993 | Okuda | 348/497 |
| 5,307,156 | 4/1994 | Yamamoto et al. | 348/453 |
| 5,455,628 | 10/1995 | Bishop | 348/446 |

OTHER PUBLICATIONS

Jack, *Video Demystified, A Handbook for the Digital Engineer*, pp. 126–136, Hightext (1993).
Sandbank, *Digital Television*, pp. 135–157, John Wiley & Sons (1990).

TMC22090/22091 Digital Video Encoders, Preduct Literature, Raytheon Semiconductor Corporation.
CXA1145P/M RGB Encoder Product Literature, Sony Corporation.
B+855 12–18M.Hz RGB/YCrCb to NTSC/PAL Encoder Products Literature, Brooktree Corporation.

*Primary Examiner*—James J. Groody
*Assistant Examiner*—Michael H. Lee
*Attorney, Agent, or Firm*—Flehr, Hohbach, Test, Albritton & Herbert

[57] ABSTRACT

A technique to derive a television color subcarrier frequency signal from a computer video signal is described. A computer generates a computer video signal including a horizontal synchronization signal component. The horizontal synchronization signal component is applied to a subcarrier frequency generator to produce a pixel clock signal and a subcarrier relative phase signal which are applied to a digital encoder. The digital encoder processes the computer video signal, the pixel clock signal, and the subcarrier relative phase signal to generate an analog baseband television signal. The subcarrier frequency generator includes a frequency conversion circuit, a timing source, and a deviation compensator. The conversion circuit receives the horizontal synchronization signal and generates the pixel clock signal. The timing source is used to generate a reference clock signal. The deviation compensator includes a signal comparison circuit to process the pixel clock signal and the reference clock signal and derive a count signal. A ratio counter circuit then processes the count signal and generates a subcarrier relative phase signal, for processing by the digital encoder.

17 Claims, 5 Drawing Sheets

APPARATUS AND METHOD TO DERIVE A TELEVISION COLOR SUBCARRIER FREQUENCY SIGNAL FROM A COMPUTER VIDEO SIGNAL

BRIEF DESCRIPTION OF THE INVENTION

This invention relates generally to converting computer video signals into television video signals. More particularly, this invention relates to a technique to process a relatively inaccurate computer horizontal synchronization video signal to derive an accurate color subcarrier frequency Signal for processing by a digital color television encoder.

BACKGROUND OF THE INVENTION

The video signal format in computers is not directly compatible with the video signal format in televisions. Thus, it is not possible to directly relay computer video signals to a television. It is advantageous to convert computer video signals into signals that may be used by a television. For example, the conversion of computer video signals into television video signals is useful in displaying computer data on a television or for recording it to a video cassette recorder (VCR). This capability is advantageous, for example, for live presentations where both the presenter and the audience need to see the computer data, to play video games on a television, or similar contexts in which it is desirable for a computer to exploit a relatively inexpensive television screen.

The conversion from computer video signals to television video signals entails the conversion of analog RGB signals to composite video signals. This operation requires a video encoder to convert computer image or graphics data (in RGB, YCbCR, or color indexed form) into a standard analog baseband television (NTSC or PAL) signal or S-VHS signal with a modulated color subcarrier.

Techniques to convert a computer video signal to a television signal are known in the art. FIG. 1 illustrates one conversion process. A computer 20 generates R,G,B signals, a horizontal synchronization signal, and a vertical synchronization signal. An interlace processing device 22 is then used to convert the non-interlaced computer signal into an interlaced signal. The interlaced signal is then stored in a memory 24. Two types of memory may be used. In a slave mode memory, only a few lines of a video frame are stored. In a master mode memory, an entire video frame is stored. A master mode memory device has much higher memory requirements and therefore is more expensive than a slave mode memory device.

The stored data from the memory 24 is relayed to an analog encoder 26. The analog encoder 26 processes the data to generate a video signal for a television 32. The processing in the analog encoder 26 relies upon a pixel clock that is generated by a phase-locked loop (PLL) 28, whose input is the horizontal synchronization signal from the computer 20. The analog encoder 26 also receives a frequency subcarrier signal (F_sc) from an oscillator 30.

In an analog encoder 26, a separate oscillator 30 may be set directly to the required subcarrier frequency. This option is not available for a digital encoder. A digital encoder is advantageous because it is more accurate than an analog encoder. Unfortunately, a digital encoder is difficult to implement. The difficulty arises from the fact that a single system clock must be used in a digital encoder. Thus, the subcarrier frequency must be derived from the clock signal from the computer 20. In other words, a separate oscillator 30 set to the subcarrier frequency cannot be exploited.

The problem with relying upon the clock signal from the computer 20 is that it is relatively inaccurate in terms of subcarrier frequency. As shown in FIG. 1, an encoder relies upon the pixel clock and the color subcarrier frequency (F_sc). Frame rate, field rate, vertical and horizontal timing are all directly derived from the pixel clock, while the color information is carried by the color subcarrier signal. A television imposes different accuracy requirements for these two signals. Errors in the pixel clock cause horizontal and vertical timing errors, but most televisions and video cassette recorders can tolerate the errors. On the other hand, for most televisions and video cassette recorders, the color subcarrier signal must be accurate to within about ±200 Hz. Television standards stipulate that the color subcarrier frequency be accurate to within ±10 Hz.

Since a master mode memory stores an entire video frame, it operates as a time buffer between the computer domain and the television domain. The timing circuitry required to store a video frame in the master mode memory can be used to generate an accurate color subcarrier frequency signal. Thus, a digital encoder can be conveniently used in a master mode memory device.

On the other hand, in a slave mode memory device, data is passed through the memory device on the fly. Thus, there is no time buffer between the computer domain and the television domain. Instead, the transition from the computer domain to the television domain must be accomplished by deriving the color subcarrier frequency signal from the horizontal synchronization signal. Specifically, the color subcarrier frequency signal must be derived by initially multiplying the horizontal synchronization signal by a constant to obtain the pixel clock. The pixel clock must then be used to generate the color subcarrier frequency signal.

Since the color subcarrier frequency signal is derived from the horizontal synchronization signal, it is important to have an accurate horizontal synchronization signal. Unfortunately, the horizontal synchronization signal from a computer is not accurate, it usually varies (from board to board) up to ±1%. The inaccuracy in the horizontal synchronization signal can result in an inaccurate color subcarrier frequency signal that precludes a television from reproducing the required color information.

Thus, it would be highly desirable to accurately derive a television color subcarrier frequency signal from an imprecise horizontal synchronization signal. This would enable a slave mode device, with inexpensive memory, to use a digital encoder to convert computer video signals into color television signals. The digital encoder would thereby provide a highly accurate reproduction of computer video signals for display on a standard television.

SUMMARY OF THE INVENTION

The invention is a technique to derive a television color subcarrier frequency signal from a computer video signal. A computer generates a computer video signal including a horizontal synchronization signal component. The horizontal synchronization signal component is applied to a subcarrier frequency generator to produce a pixel clock signal and a subcarrier relative phase signal which are applied to a digital encoder. The digital encoder processes the computer video signal, the pixel clock signal, and the subcarrier relative phase signal to generate an analog baseband television signal. The subcarrier frequency generator includes a frequency conversion circuit, a timing source, and a deviation compensator. The conversion circuit receives the horizontal synchronization signal and generates the pixel clock signal. The timing source is used to generate a reference clock signal. The deviation compensator includes a signal comparison circuit to process the pixel clock signal and the reference clock signal and derive a count signal. A ratio counter circuit then processes the count signal and generates a subcarrier relative phase signal, for processing by the digital encoder.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
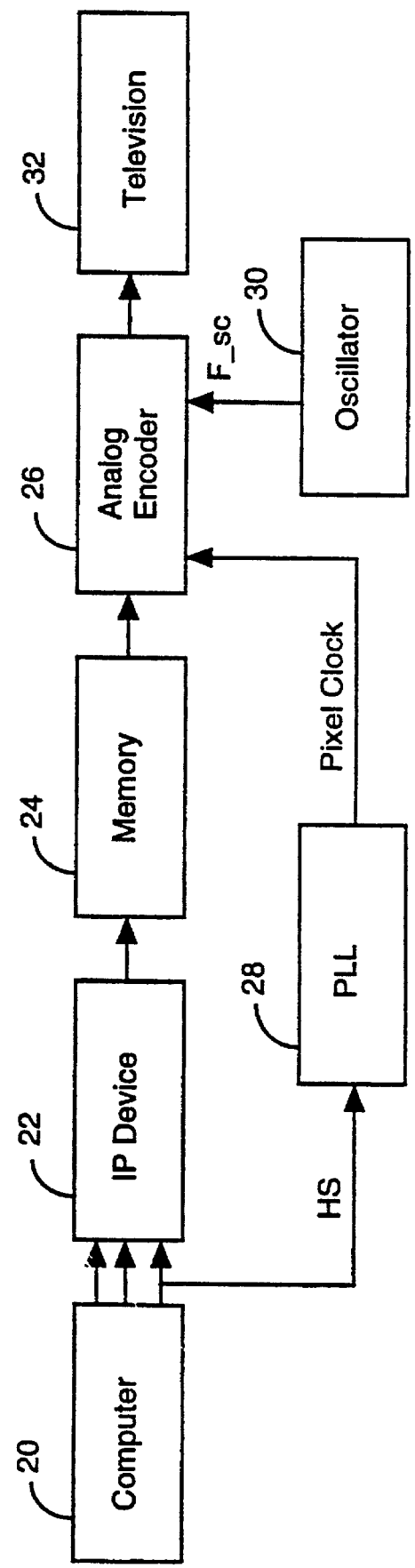
FIG. 1 is illustrates a prior art analog device to convert computer video signals to television video signals.
Figure 2:
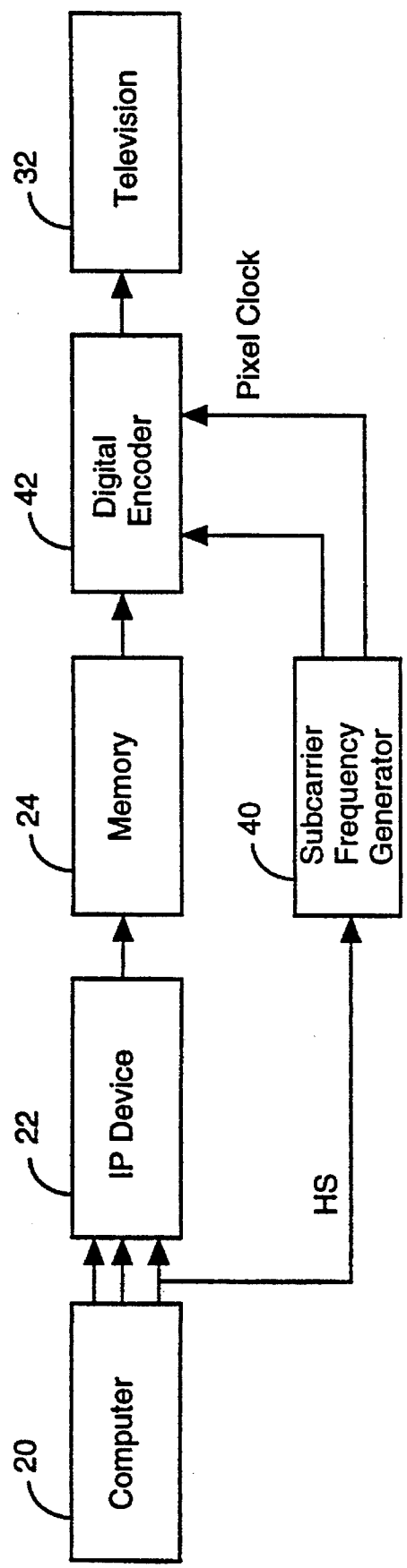
FIG. 2 illustrates one embodiment of a slave mode device with a digital encoder to convert computer video signals to television video signals.

FIG. 2 illustrates a subcarrier frequency generator 40 in accordance with the invention. As shown, the subcarrier frequency generator 40 receives a horizontal synchronization (HS) signal from the computer 20. In response to this signal, it generates a color subcarrier relative phase signal and a pixel clock. Both of the generated signals are applied to a digital encoder 42 which then produces an analog baseband television signal for television 32. Thus, unlike prior art devices that use analog encoders, the present invention enjoys the accuracy of a digital encoder 42. Moreover, the invention allows the digital encoder to be used in connection with a slave mode memory 24 because the subcarrier frequency generator 40 produces a subcarrier relative phase signal that can be used by the digital encoder to derive an accurate subcarrier frequency signal. By using a slave mode memory 24, the subcarrier frequency generator 40 may be used in a device with limited memory, thereby reducing the cost of the device.

Figure 3:
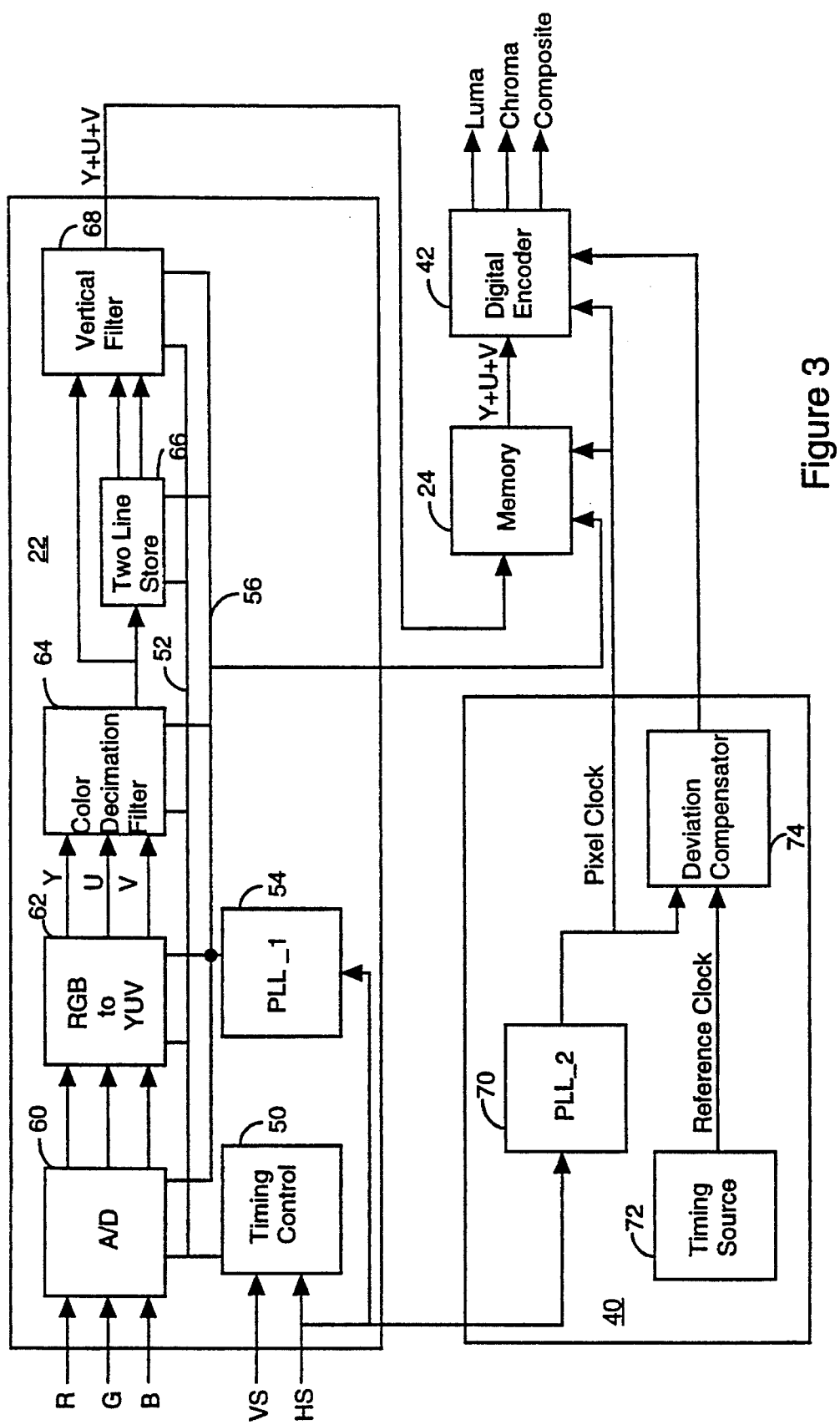
FIG. 3 is a detailed schematic of a portion of the device of FIG. 2.

FIG. 3 is a more detailed representation of the interlace processing device 22, memory 24, subcarrier frequency generator 40, and digital encoder 42 of FIG. 2. The interlace processing device 22 may operate in accordance with known techniques. In FIG. 3, the interlace processing device 22 is shown as receiving analog Red (R), Green (G), and Blue (B) video signals from a computer (not shown). In addition, the interlace processing device 22 receives a vertical synchronization signal (VS) and a horizontal synchronization (HS) signal from the computer. The vertical synchronization signal and the horizontal synchronization signal are used by a timing control circuit 50 to produce control signals that are applied to line 52. A first phase-locked loop (PLL_1) 54 processes the horizontal synchronization signal and generates a write clock signal that is applied to line 56.

An analog-to-digital converter 60 transforms the analog RGB signals into corresponding digital RGB signals that are applied to an RGB to YUV converter 62. The RGB to YUV converter 62 converts the RGB signals into the YUV color space, as known in the art. The YUV color space signals are applied to a color decimation filter 64, which scales the image signal without producing image artifacts.

In the disclosed embodiment, the output of the color decimation filter 64 is conveyed to a two line store memory 66. A vertical filter 68 is then used to average three lines of image data, a technique known in the art, to provide an averaged YUV signal with reduced flicker. The YUV signal is then conveyed to a slave mode memory device 24. The slave mode memory device 24 subsequently loads its data into the digital encoder 42.

The processing up to this juncture is common in the video processing arts. The invention is directed toward providing an accurate color subcarrier relative phase signal and pixel clock to the digital encoder 42 based solely upon a horizontal synchronization signal input. This functionality is provided by the subcarrier frequency generator 40 of the invention.

As shown in FIG. 3, the subcarrier frequency generator 40 includes a frequency conversion circuit 70, implemented here as a phase-locked loop (PLL_2), that receives the horizontal synchronization signal from the computer (not shown). By multiplying the horizontal synchronization signal by a constant, a pixel clock signal is generated. As shown in FIG. 3, the generated pixel clock is applied to the digital encoder 42. The generated pixel clock is also applied to a deviation compensator 74. An additional input into the deviation compensator 74 is a reference clock provided by a timing source 72. The timing source 72 may be any accurate timing source at any frequency.

Figure 4:
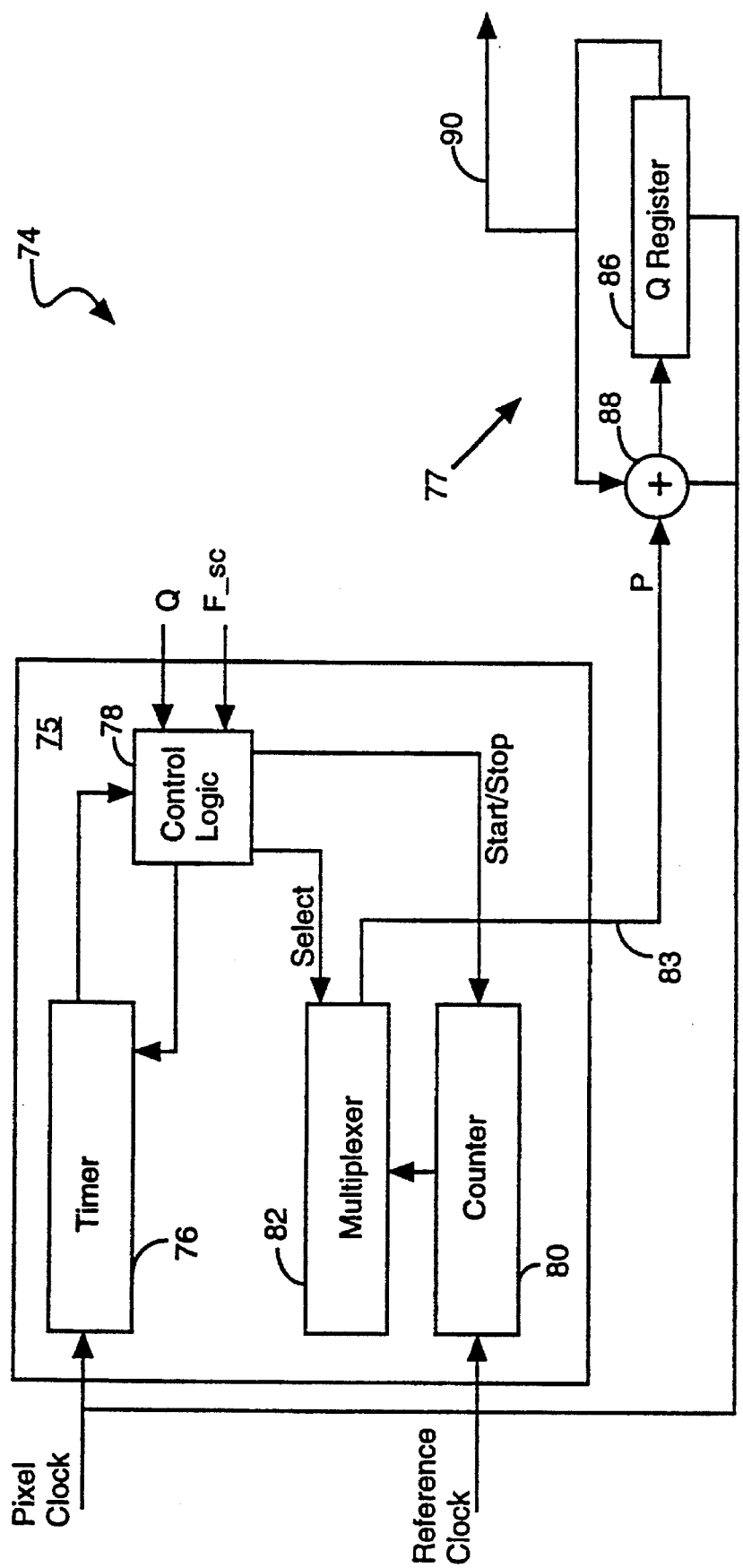
FIG. 4 illustrates one embodiment of the deviation compensator of the invention.

FIG. 4 illustrates one embodiment of a deviation compensator in accordance with the invention. The deviation compensator 74 includes a signal comparison circuit 75 and a P/Q counter 77. The purpose of the signal comparison circuit 75 is to generate a cycle count value P. The term P is subsequently used to derive a subcarrier frequency value using the following equation:

$$F_{ac}=P/Q \; F_{pix} \qquad (1)$$

In equation 1, $F_{ac}$ is the subcarrier frequency, Q is a pre-determined value used in the P/Q counter 77, and $F_{pix}$ is the frequency of the pixel clock.

The signal comparison circuit 75 generates the value P by relying upon a time value t and the frequency of the reference clock. In particular, the value P is defined as follows:

$$P= F_R t \qquad (2)$$

In equation 2, $F_R$ is the frequency of the reference clock and t is defined as follows:

$$t= (1/F_{pix})[Q(F_{ac}/F_R)] \qquad (3)$$

In equation 3, $F_{pix}$ is the frequency of the pixel clock, Q is the pre-determined value used in the P/Q counter 77, $F_{ac}$ is the subcarrier frequency (3.58 MHz for NTSC, 4.43 MHz for PAL), and $F_R$ is the frequency of the reference clock. Substituting equation 3 into equation 2 we get:

$$P=(F_{ac}/F_{pix})Q \qquad (4)$$

As can be appreciated from equation 4, to obtain a value for P, the product of $F_{ac}$ and Q is divided by $F_{pix}$. The values $F_{ac}$ and Q are known and therefore can be stored in control logic 78. Note that the desired frequency $F_{ac}$ is known. However, this information alone does not allow one to reconstruct a subcarrier frequency signal from a pixel clock signal whose frequency is varying.

The operation of equation 4 is executed by the signal comparison circuit 75 shown in FIG. 4. The timer 76 in FIG. 4 is activated by the pixel clock and runs for a period of time defined by the term t. As can be appreciated from equation 3, the quantity t is a function of the pixel clock and the reference clock, the input signals to the signal comparison circuit 75. The quantity t is also a function of the value Q and the subcarrier frequency $F_{ac}$. These values are known. Thus, the control logic 78 can store these values (or their product).

Note that in equation 3, the term $(1/F_{pix})$ is the time of each clock cycle of the pixel clock. The term $[Q(F_{ac}/F_R)]$ defines the total number of clock transitions to be executed by the timer 76. In other words, the pixel clock drives the timer 76 for $[Q(F_{ac}/F_R)]$ transitions. During that time period, the counter 80 counts the number of signal transitions in the reference clock. That is, at the beginning of the time period the control logic 78 enables the counter 80 and at the end of the time period the control logic 78 disables the counter 80. At that point, the counter 80 stores the number of signal transitions that transpired during the time period t, this cycle count is equivalent to the P term.

The cycle count may be read from the counter 80 through the use of a multiplexer 82 whose select lines are activated by control logic 78. For example, if a twenty-four bit count value is stored by the counter, the count value may be read out by the multiplexer 82 in eight bit increments. The multiplexer 82 provides an inexpensive way to obtain data from the counter 80.

The output of the multiplexer 82 is applied to signal line 83, which is connected to a p/q ratio counter 77 comprising an adder 88 and a q-register 86, each of which are clocked by the pixel clock. Ratio counters of this type are known in the art. A two-stage ratio counter, also known in the art, may also be used.

As known in the art, the contents of the q-register 86 are constrained to a predetermined range of values. If the input to the q-register 86 exceeds or equals q, q is subtracted from the contents, thereby providing a modulo division operation. In the present case, any register overflow corresponds to the completion of a full cycle of the color subcarrier frequency signal. Since only the remainder, that is, the subcarrier phase, is required in this application, the number of whole cycles completed is of no interest and is therefore not tracked. The output of the q-register 86 shows the relative phase of a subcarrier frequency waveform in qths of a subcarrier period. This output signal, applied to line 90, is referred to as a subcarrier relative phase signal.

Figure 5:
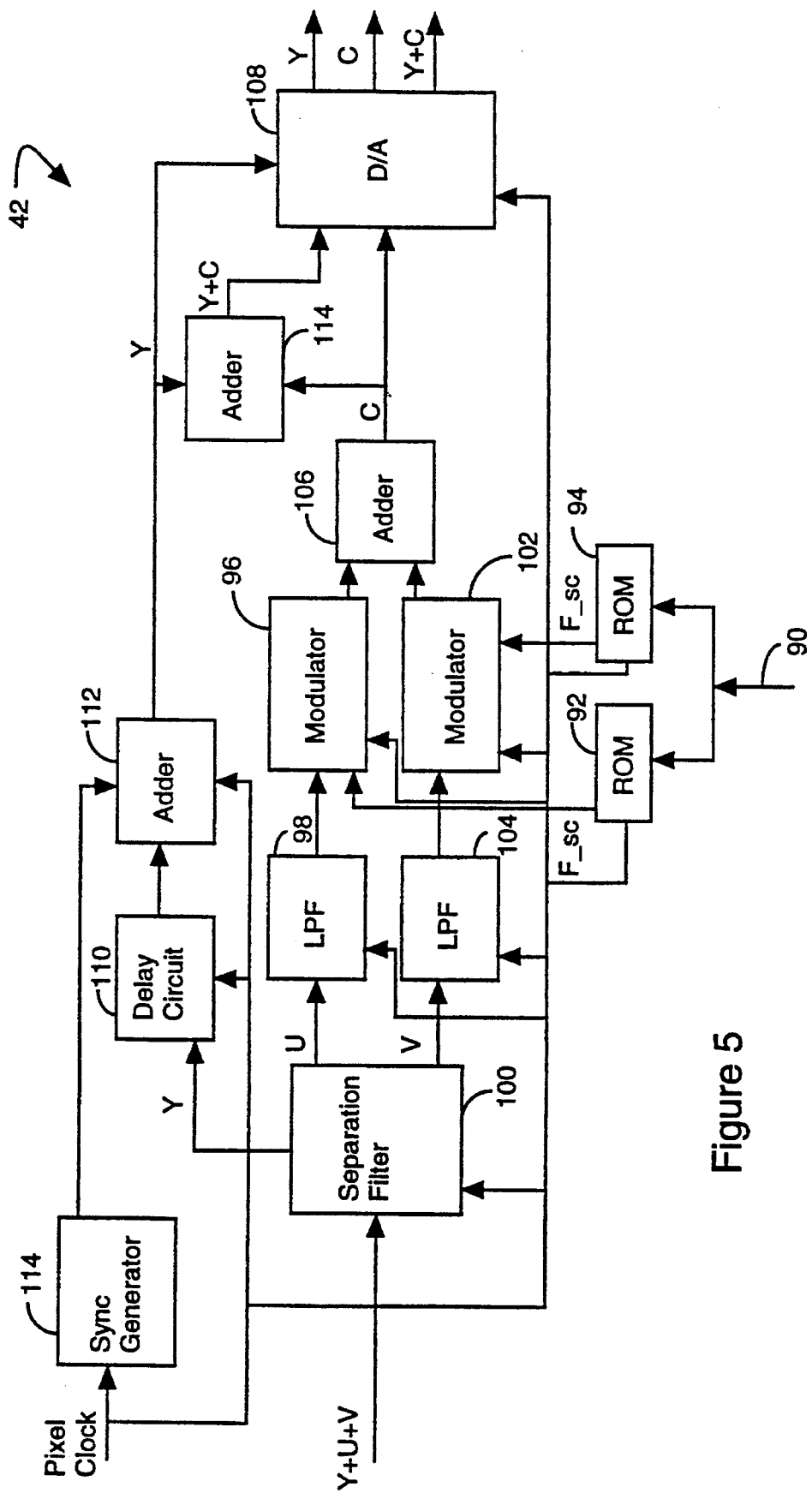
FIG. 5 illustrates a digital encoder that may be used in accordance with the invention.

The subcarrier relative phase signal is routed to two ROMs 92 and 94, in this embodiment shown as part of the encoder 42 of FIG. 5. The subcarrier relative phase signal is used to address each ROM. Each ROM address has a corresponding analog signal output value. In sum, the outputs of the ROMs 92 and 94 are the desired sine and cosine subcarrier frequency signals. The remaining processing of the subcarrier frequency signal in the digital encoder 42 will be discussed below.

The operations of the signal comparison circuit 75, the p/q ratio counter 77 and the ROM look-up tables mathematically perform the operation of Equation 1, namely, $F_{ac}=(P/Q)F_{pix}$. Note that in accordance with the invention, the subcarrier frequency signal $F_{ac}$ is constructed from the P, Q and $F_{pix}$ signals. Also note that as the frequency of the pixel clock ($F_{pix}$) varies, the term P provided by the circuitry of the invention also varies to accommodate the frequency variations of the pixel clock. While the ultimate subcarrier frequency to be used is known, the present invention generates this signal from a varying pixel clock. In accordance with the invention, the varying pixel clock is offset by a varying P value, as generated by the signal comparison circuit 75.

The subcarrier frequency signal derived in accordance with the invention may be processed by a digital encoder 42. Since prior art devices do not generate an accurate subcarrier frequency signal from the horizontal synchronization signal, prior art devices cannot exploit a digital encoder 42. A suitable digital encoder for use in connection with the invention is shown in FIG. 5.

The output signals from the ROMs 92, 94 are respectively conveyed to modulators 96 and 102. Each modulator modulates a portion of the YUV signal to the subcarrier frequency signal. Specifically, the YUV signal from memory 24 is applied to a separation filter 100 that generates individual Y, U, and V signals. The U signal is conveyed to a low pass filter 98 and is then modulated to the subcarrier frequency signal through modulator 96. Similarly, the V signal is conveyed to a low pass filter 104 and is then modulated to the subcarrier frequency signal through modulator 102. The outputs from the modulators are combined at adder 106 to generate a chrominance signal (C).

A luminance signal is generated in the digital encoder 47 by applying the pixel clock to a synchronization generator 114. The output of the synchronization generator 114 is applied to an adder 112, which also receives the Y signal via a delay circuit 110. The adder produces the luminance signal (Y).

The luminance signal (Y) and chrominance signal (C) are combined at adder 114 to produce a composite video signal (Y+ C). The luminance signal (Y), the chrominance signal (C), and the composite video signal (Y+ C) are each applied to a digital-to-analog converter 108. The output of the digital-to-analog converter is an analog luminance signal (Y), an analog chrominance signal (C), and an analog composite video signal (Y+ C), which constitute an analog baseband television signal that may be processed by a standard television.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. An apparatus to derive a television color subcarrier frequency signal from a horizontal synchronization signal, comprising:

a subcarrier frequency generator for connection between a digital encoder and a computer that generates a horizontal synchronization signal, said subcarrier frequency generator including a frequency conversion circuit to receive a horizontal synchronization signal from said computer and generate a pixel clock signal therefrom, a timing source to generate a reference clock signal, and a deviation compensator to process said pixel clock signal and said reference clock signal and derive a subcarrier relative phase signal for generating said television color subcarrier frequency signal.

2. The apparatus of claim 1 wherein said frequency conversion circuit is a phase-locked loop.

3. The apparatus of claim 1 wherein said deviation compensator includes a signal comparison circuit including:

a timer that is activated for a period of time established by said pixel clock signal; and a counter that counts signal transitions in said reference clock signal during said period of time to form a cycle count signal.

4. The apparatus of claim 3 wherein said signal comparison circuit further includes:

a multiplexer connected to said counter;

a control logic circuit to activate said counter and to provide selection signals to said multiplexer to read said cycle count signal from said counter.

5. The apparatus of claim 1 wherein said deviation compensator includes a ratio counter circuit including an adder and a modulo register for storing numeric values in a predetermined range.

6. The apparatus of claim i further comprising a slave mode memory connected between said computer and said digital encoder.

7. The apparatus of claim 6 further comprising an interlace processing device connected between said computer and said digital encoder.

8. An apparatus to convert computer video data into television video data, said apparatus comprising:

an interlace processing device to receive a computer video signal from a computer and generate an interlaced video signal;

a slave mode memory device connected to said interlace processing device to store a segment of said interlaced video signal, said segment of said interlaced video signal corresponding to several lines of a video frame;

a digital encoder connected to said slave mode memory device to convert said segment of said interlaced video signal into an analog baseband television signal;

a subcarrier frequency generator connected to said digital encoder, said subcarrier frequency generator including a timing source to generate a reference clock signal, and a deviation compensator including a signal comparison circuit to process a pixel clock signal and said reference clock signal and derive a cycle count signal therefrom, a ratio counter circuit to process said cycle count signal and generate a subcarrier relative phase signal for conversion to a television color subcarrier frequency signal that is processed by said digital encoder.

9. The apparatus of claim 8 wherein said frequency conversion circuit is a phase-locked loop.

10. The apparatus of claim 8 wherein said signal comparison circuit includes:

a timer that is activated for a period of time defined by a predetermined number of pixel clock signal cycles; and a counter that counts signal transitions in said reference clock signal during said period of time to form said cycle count signal.

11. The apparatus of claim 10 wherein said signal comparison circuit further includes:

a multiplexer connected to said counter;

a control logic circuit to activate said counter and to provide selection signals to said multiplexer to read said count value from said counter.

12. The apparatus of claim 8 wherein said ratio counter circuit includes an adder and a modulo register for storing numeric values in a predetermined range equal to or less than a value q.

13. A method to convert a horizontal synchronization signal into a television color subcarrier frequency signal, said method comprising the steps of:

deriving a pixel clock signal from a horizontal synchronization signal;

generating a reference clock signal;

comparing said reference clock signal to said pixel clock signal to obtain a subcarrier relative phase signal; and reconstructing a television color subcarrier frequency signal from said subcarrier relative phase signal.

14. The method of claim 13 further comprising the step of applying said television color subcarrier frequency signal to a digital encoder.

15. The method of claim 14 further comprising the step of applying said pixel clock signal to said digital encoder.

16. The method of claim 15 further comprising the step of conveying video data from a slave mode memory to said digital encoder.

17. The method of claim 16 further comprising the step of operating said digital encoder to generate an analog baseband television signal.

* * * * *